United States Patent [19]

Valdes

[11] Patent Number: 4,659,039
[45] Date of Patent: Apr. 21, 1987

[54] LANDING GEAR DRIVE SYSTEM

[76] Inventor: Guillermo A. Valdes, 1011 SW. 42nd Ave., Apt. 2, Miami, Fla. 33134

[21] Appl. No.: 759,696

[22] Filed: Jul. 29, 1985

[51] Int. Cl.⁴ ............................................. B64C 25/40
[52] U.S. Cl. .................................................. 244/103.5
[58] Field of Search ........................ 244/103.5; 192/45

[56] References Cited

U.S. PATENT DOCUMENTS

| | | | |
|---|---|---|---|
| 1,642,645 | 9/1927 | Constantinesco | 192/45 |
| 2,069,558 | 2/1937 | Rauen et al. | 192/45 |
| 2,672,308 | 3/1954 | Farrell | 244/103.5 |
| 3,850,389 | 11/1974 | Dixon | 244/103.5 |

FOREIGN PATENT DOCUMENTS 603792  8/1946  United Kingdom ............. 244/103.5

Primary Examiner—Trygve M. Blix
Assistant Examiner—Rodney Corl
Attorney, Agent, or Firm—Macdonald J. Wiggins

[57] ABSTRACT

A drive motor system is coupled to the landing gear wheels of an air craft via a free wheeling clutch assembly. The drive motor system is energized when the landing gear is extended preparatory for landing either manually or automatically. The drive motor system is controlled to rotate the wheels to have the linear velocity of the periphery of a wheel the same as the ground speed of the aircraft at touchdown. A touchdown sensor stops the drive motor system at touchdown causing the clutch assembly to disengage the wheels when the rpm of the wheel is greater than the drive system rpm. An automatic control system is described.

3 Claims, 8 Drawing Figures

LANDING GEAR DRIVE SYSTEM

BACKGROUND OF THE INVENTION

1. Field of the Invention

The present invention relates to aircraft landing gear wheels and more particularly to a device for rotating the wheels prior to landing and for disengaging the drive system after landing.

2. Description of the Prior Art

It is well known that landing of aircraft causes the wheels to slip and drag after contacting the ground before the wheels reach full speed of rotation and that such action rapidly wears the tire surfaces and may burn or strip rubber off of the tires. This problem is especially severe for commercial aircraft and military aircraft due to their size and weight. A number of attempts have been made to solve this problem but none of these appear to have been sufficiently practical so as to be generally adopted.

Examples of previous devices for this purpose may be found in such patents as U.S. Pat. No. 3,850,389 to Dixon, which teaches a variable speed motor that may be selectively engaged and disengaged from the wheel for rotating the wheel during flight and which disengages when the motor is turned off after landing. Ellsworth in U.S. Pat. No. 3,542,318 uses motors drivingly connected to the wheels which are automatically energized when the landing gear begins to lower prior to landing and which are turned off as soon as the gear is fully lowered. As may be noted, this system does not permit control of the wheel rotation to the point of landing. In U.S. Pat. No. 3,096,052, Hardigan discloses a device for prespinning aircraft landing wheels which utilizes a ground speed indicator to control the rate of rotation. A number of other patents have been issued in the United States in which this problem has been approached by providing vanes and the like attached to the wheels to utilize aerodynamic forces to cause rotation. In spite of this body of prior art, there is no known system presently available and in common use which provides a reliable device which can prespin the aircraft wheels prior to landing to a speed which will minimize scuffing and wear upon landing and which includes means for automatically disconnecting the driving system from the wheels at the moment of touchdown to obviate the dangers and problems which can occur when the driving system remains engaged.

SUMMARY OF THE INVENTION

The present invention utilizes for each wheel or each set of wheels on an aircraft, a drive motor preferably powered from the aircraft engine. The drive motor may be hydraulic or electrical. The drive motor is coupled to a transmission in which the gearing is selected to provide an efficient motor speed and an efficient speed of rotation of the wheel. A free-wheeling coupling is interposed between the transmission and each wheel which serves to automatically disengage the wheel from the driving system upon touchdown.

A preferred construction of a wheel coupling includes a circular wheel drum directly connected to a hub to which the wheel is attached. The hub is supported in a conventional wheel strut and bearing assembly. Thus, the wheel is free to rotate on its hub assembly. Disposed within the drum is a ramp-and-ball-type, free-wheeling coupling which may include a central spider connected to an external sprocket with the sprocket and spider supported on suitable bearings concentric with the drum and hub. The outer periphery of the spider includes a plurality of radially disposed lugs with the space between lugs forming a set of ramps. A set of rollers is disposed around the periphery of the spider with one cylindrical roller associated with each ramp. The space between the innermost portion of each ramp and the interior surface of the drum is greater than the diameter of the roller while the space between the outermost portion of the ramp and the interior surface of the drum is somewhat less than the diameter of the roller. Preferably, a compression spring is disposed between each lug and its associated roller which tends to urge the roller towards the higher outer portion of its ramp.

As may now be understood, the action of the spring and rotation of the spider in the appropriate direction will cause the roller to advance up its ramp to the point where it contacts the inner surface of the drum resulting in rotation of the drum at the same speed of rotation of the spider. This action will take place when the rate of rotation of the spider is originally at a higher rate than the rate of rotation of the drum. Whenever the drum rotation exceeds the rate of rotation of the spider, the rollers are moved down the ramp thereby releasing the contact between the roller and the interior of the drum, permitting the wheel to then freewheel.

The sprocket attached to and driving the spider may be coupled by a chain to the transmission and drive motor in a conventional fashion or, alternatively, gears may be substituted for the chain and sprocket arrangement as will be obvious to those of skill in the art.

Preferably, the drive motor and, consequently, the wheel speeds are controlled to cause the rate of rotation of the wheels to be correct for the ground speed of the aircraft upon touchdown. Either a manual control or an automatic control may be utilized for this purpose.

To operate the system of the invention, the wheels are lowered on the aircraft preparatory to landing and the drive motors are energized to bring the rpm of the wheels to a desired value. This speed is maintained until touchdown. Upon touchdown, the periphery of the tires will be rotating at a speed having essentially the same linear speed as that of the aircraft moving down the runway. Therefore, the normal slipping and scuffing that occurs will be esentially eliminated. Preferably, the drive motor is turned off at the point of touchdown. In such case the rate of rotation of the spider assembly reduces and ceases. Due to the movement of the aircraft on its wheels, the rate of rotation of the drum will be greater than that of the spider and the free-wheeling assembly will release, permitting normal rollout of the aircraft.

It is therefore a principal object of the invention to provide an effective system for prespinning aircraft wheels prior to landing and for automatically releasing the driving mechanism at the point of touchdown.

It is another object of the invention to provide a landing gear device for aircraft having means for prespinning the aircraft wheels prior to landing and having a free-wheeling coupling between the drive means and the wheels which will automatically disengage upon landing.

It is a further object of the invention to provide a landing gear wheel device utilizing a roller and ramp free-wheeling device.

DETAILED DESCRIPTION OF THE PREFERRED EMBODIMENT

Figure 1:
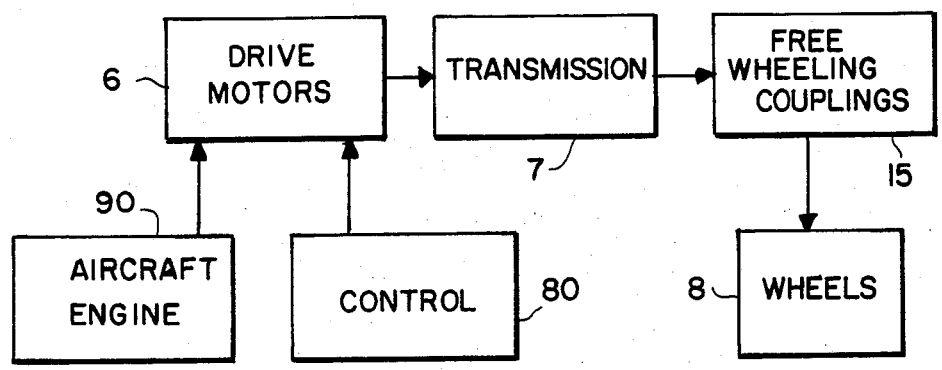
FIG. 1 is a block diagram of the system of the invention.

Referring to FIG. 1, a simplified block diagram of the system of the invention is shown. A set of drive motors 6 is provided such that each wheel on a multi-wheel landing gear is driven. As will be apparent, an individual motor may be provided for each wheel or a single motor with suitable drive systems to each wheel may be used. The invention contemplates any suitable drive motor, such as a hydraulic motor or an electrical motor. In either case, energy is preferably obtained from the aircraft engine 90 for powering drive motors 6.

To be able to operate drive motors 6 at their most efficient speeds, a set of transmissions 7 is utilized. Transmissions 7 are coupled to wheels 8 by means of a set of free-wheeling couplings 15. When drive motors 6 have caused rotation of wheels 8 such that the linear speed of the periphery of the tires is essentially equal to the ground speed of the aircraft at touchdown, it is required to disconnect any driving torque from the wheels at the moment of touchdown to provide the pilot with maximum control of the aircraft on the runway. Free-wheeling couplings 15 serve this function and, advantageously, instantaneously disconnect the wheels from the drive system. A control system 80 is provided which includes means for sensing ground speed and touch down to control the speed of drive motors 6.

Figure 2:
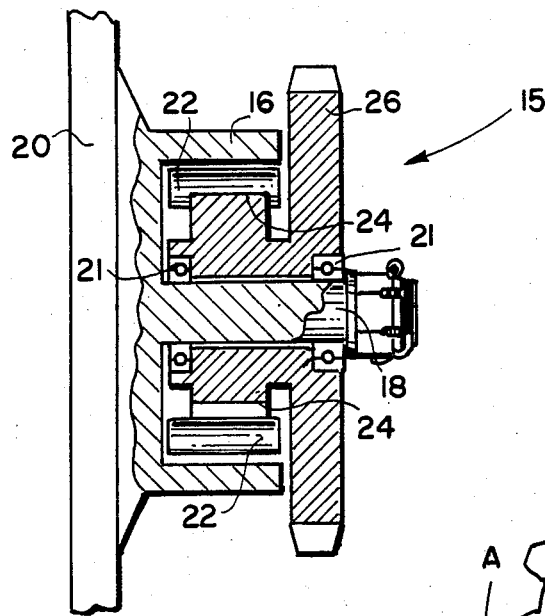
FIG. 2 is a cross-sectional view of a wheel hub and driving sprocket showing the free-wheeling coupling device.
Figure 3:
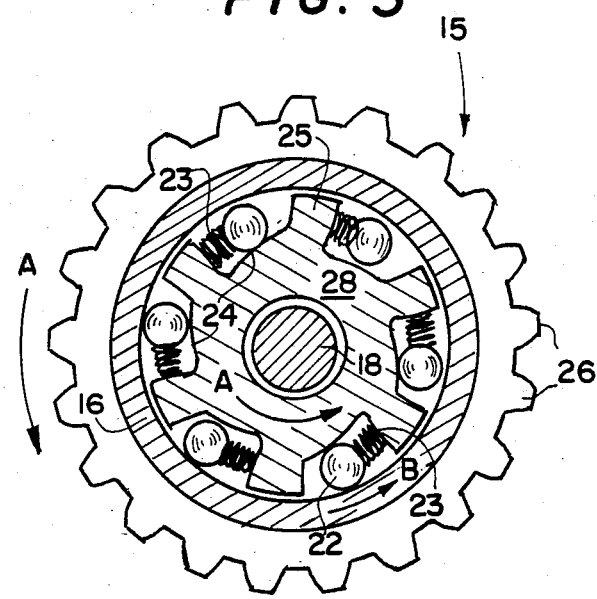
FIG. 3 is a cross-sectional view, 3—3, of the hub assembly of FIG. 2.

FIGS. 2 and 3 show details of a free-wheel coupling 15 eminently suitable for the invention. In the cross-sectional view of coupling 15 in FIG. 2, an exemplary wheel flange 20 is shown having an axle 18, a hub, and bearings 21 projecting therefrom. The aircraft wheel, which is omitted in FIG. 2 for clarity, is mounted on wheel flange 20 and supported by any suitable landing gear construction. Axle shaft 18 and flange 20 have a drum 16 integral therewith. A drive sprocket 26 is mounted on axle 18 by means of bearings 21 and may therefore rotate independently of axle 18. As will be discussed herein below, sprocket 26 is driven from a transmission and drive motor. As best seen in FIG. 3, which is a cross-sectional view through the plane 3—3 of FIG. 2, a spider assembly 28 is integral with sprocket 26. Spider 28 includes a hub portion having a plurality of ramps 24 separated by lugs or projections 25, thus forming a plurality of peripheral openings in spider 28. Disposed in each opening is a roller 22 parallel with axle 18 and free to move within the peripheral opening. A coil compression spring 23 is installed between each roller 22 and adjacent projection 25. As will be noted from FIG. 3, when spring 23 is extended, roller 22 advances clockwise with respect to ramp 24 and will contact the surface of ramp 24 and the inner surface of drum 16. Conversely, when spring 23 is compressed, roller 22 will move down the ramp 24 counterclockwise and will no longer make contact with both ramp 24 and the interior surface of drum 16.

Assume that sprocket 25 is being driven through a transmission and drive motor as indicated by arrows A in FIG. 3 and wheel flange 20 and drum 16 are stationary. Springs 23 urge rollers 22 up their respective ramps 24 such that normally there is slight contact between drum 16 and rollers 22. Thus, as spider 28 rotates counterclockwise as shown by arrow A, rollers 22 will jam between ramp 24 and the inner surface of drum 16 causing drum 16 to rotate at the same speed as sprocket 26. Therefore, the wheel attached to wheel flange 20 will be brought up to the same rotational speed as sprocket 26. In accordance with the invention, this rotational speed will be controlled such that the periphery of the tires will have a linear velocity essentially equal to the ground speed at point of touchdown.

It may also be understood that when drum 16 rotates in the direction shown by arrow B at a higher rotational speed than spider A, rollers 22 will be urged counterclockwise, compressing springs 23 and releasing the drive between sprocket 26 and drum 16 to produce a desired free-wheeling condition.

Figure 4:
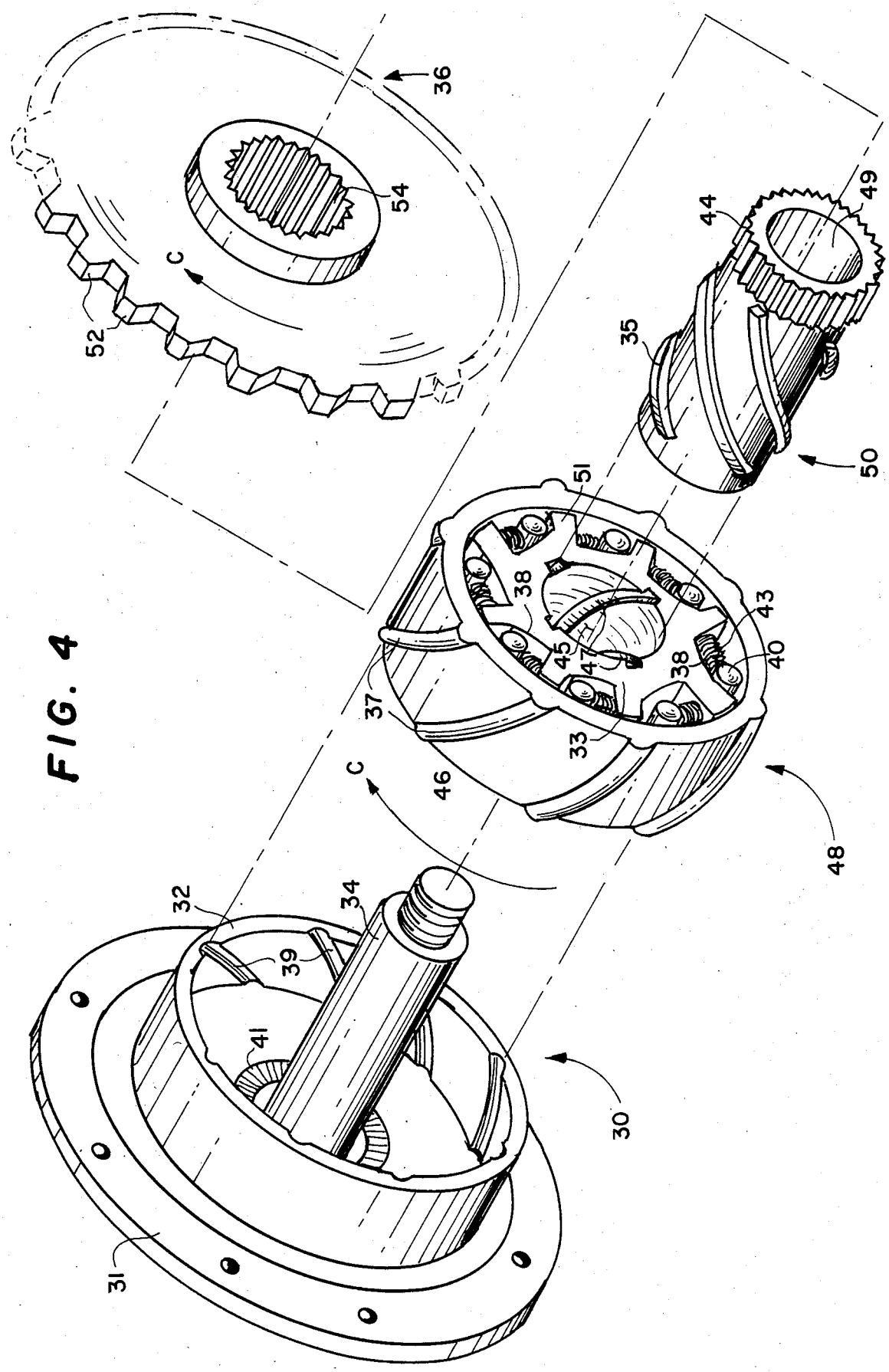
FIG. 4 is a perspective exploded view of an alternative free-wheeling coupling device.
Figure 5:
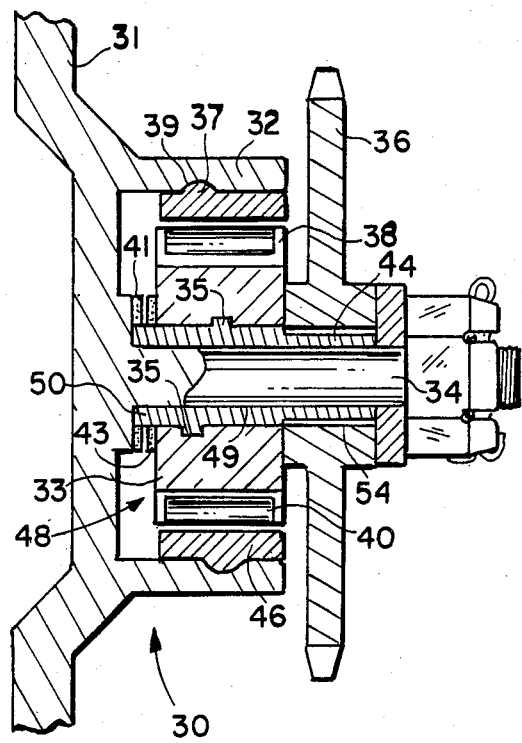
FIG. 5 is a cross-sectional view of the coupling device of FIG. 4.

An alternative free-wheeling coupling is shown in FIGS. 4 and 5 which will release and engage in a very positive manner thereby reducing wear on the moving elements thereof. The major elements are as follows: wheel flange and drum assembly 30; inner drum and roller-ramp assembly 48; spiral drive unit 50; and sprocket 36. The elements are shown in exploded view in FIG. 4 and in assembled cross-sectional view in FIG. 5.

Wheel flange 31 has a drum 32 and axle 34 extending from its outer face. The interior surface of drum 32 includes a plurality of axially oriented grooves 39 having a helical pitch. The face of flange 31 within drum 32 includes an annular clutch surface 41 concentric with axle 34. Clutch surface 41 may be formed as a plurality of teeth or may utilize a standard clutch lining material.

Inner drum and roller-ramp assembly 48 comprises a drum portion 46 having a plurality of axially oriented splines 37 having a helical pitch complementary to grooves 39 in drum 32. As may be recognized, assembly 48 is disposed in drum 32 with splines 37 engaging grooves 39. When drum 46 is rotated in the direction of arrow C with respect to drum 32, it advances toward annular clutch surface 41. A spider assembly 33 is disposed within drum 46 having a plurality of ramps 38 and projections 51. Rollers 40 and springs 43 are disposed on ramps 38 in the peripheral openings between projections 39. As best seen in the cross-sectional view of FIG. 5, the rear face of spider 33 includes an annular clutch surface 43. Thus, when assembly 48 rotates as at arrow C, clutch surfaces 43 and 41 engage, causing wheel flange and drum assembly 30 to rotate.

As will be explained more fully below, spider assembly 33 will engage drum 46 and thus power is transmitted to the wheel through both drum 46 and clutches 41, 43.

Spider 33 has a concentric opening 45 having a plurality of helical grooves 47 in the surface thereof. Helical drive unit 50 includes a set of splines 35 complementary to grooves 47 and a splined end 44. Drive unit 50 has a longitudinal cylindrical opening 49 therethrough and which is disposed over axle 34 within opening 45 as seen in FIG. 5. Sprocket 36 is installed on the splined end of drive unit 50.

As will now be recognized, a wheel attached to wheel flange 31 will be stationary prior to landing. When the drive motors of the invention are energized, sprocket 36 will turn in the direction of arrow C of FIG. 4, rotating spider assembly 33 via drive unit 50. This causes spider assembly 33 to rotate thereby causing ramps 38 to engage rollers 40 against the inner surface of drum 46. As drum 46 then rotates, drum assembly 48 and spider assembly 33 move toward clutch surface 41 engaging clutch surface 43. Thus, a positive drive to wheel flange 31 results. After landing, when power to the drive motors 6 is cut off, drum 46 will be rotating at a higher rate than spider assembly 33 causing rollers 40 to release and drum 46 to move outward releasing clutch surfaces 41 and 43, producing a free-wheeling action.

Figure 6:
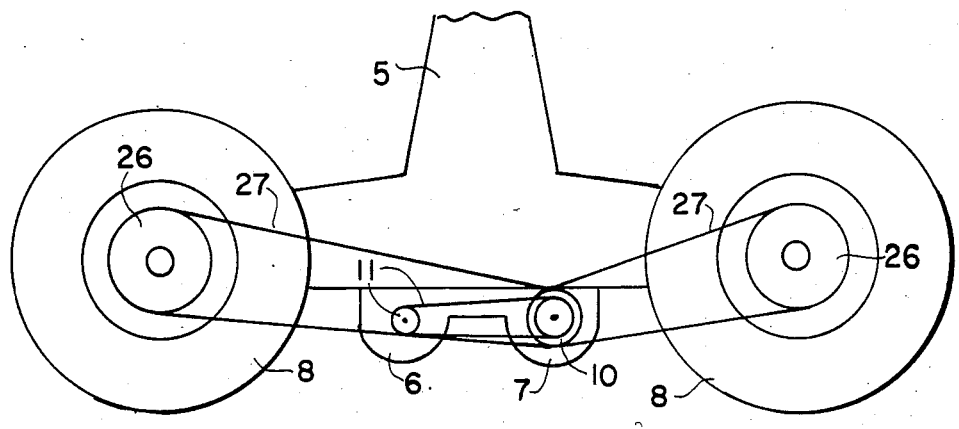
FIG. 6 is a simplified illustration of one set of landing wheels for a large transport-type aircraft showing a typical installation of the invention.

Turning now to FIG. 6, a schematic drawing is shown for a typical drive system for a large aircraft. As illustrated, a landing gear support structure 5 supports two landing wheels 8 although the same structure may also support four wheels. Drive motor 6 is suitably mounted to structure 5 as is transmission 7. Motor 6 drives transmission 7 through chain and sprocket assembly 11. A pair of chain and sprocket assemblies 26, 27 drive wheels 8 from transmission 7. It is to be recognized that the drive system shown is for exemplary purposes only and the wheels may be driven by well-known gearing methods as well.

Figure 7:
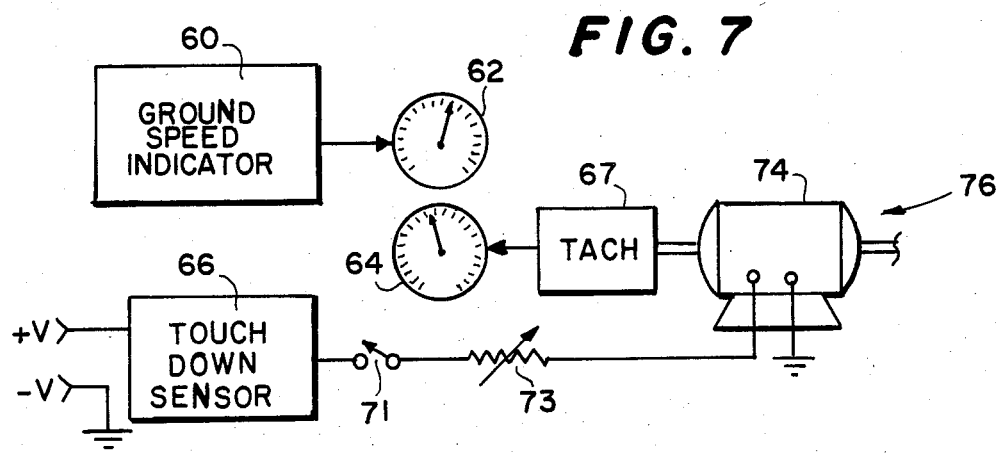
FIG. 7 illustrates details of a typical manual control system in accordance with the invention.

As previously discussed, it is necesssary to energize motor 6 upon extension of the landing gear and to bring wheels 8 up to a predetermined speed dependent upon the ground speed of the aircraft at touchdown. In FIG. 7, a manual control system 76 which is suitable for the invention is shown. In this example, an electric motor 74 is driven from the aircraft electrical system which may be, for example, 24 volts dc indicated by +V and −V in the figure. A touchdown sensor 66 is provided which utilizes a normally closed switch. Therefore, as the landing gear is lowered, the circuit through touchdown sensor 38 is closed. A manual switch 71 is provided which the pilot operates after the gear is lowered. Closing switch 71 energizes motor 74 via rheostat 73. The aircraft includes a ground speed indicator system 60 with meter 62. Adjacent to meter 62 is a tachometer indicator 64 operated from a tachometer 67 attached to the shaft of motor 74. Tach indicator 64 is calibrated in knots, or miles per hour, indicative of ground speed with a calibration determined from the circumference of the tires and related to the rpm of the tire which produces a specific linear peripheral speed of the tire. As will be understood by those of skill in the art, calibration of tach indicator 64 will include the effects of the transmission ratio and the driving sprockets or gear ratios.

The pilot adjusts rheostat 73 to match the tach indicator 64 to the ground speed indicated by ground speed meter 62. Touchdown sensor 66 may be any of a number of devices which will cause the switch contacts to open upon touchdown of the tires. For example, an inertia switch mounted on the wheel-supporting structure, such as 5 in FIG. 4, is suitable. Alternatively, a Microswitch ® may be mounted adjacent the oleo strut. Since the oleo struts are fully extended prior to touchdown and will retract as the plane lands, a normally closed microswitch can be adjusted such that it will be opened whenever the strut begins to close. Although not shown in FIG. 5, the various switches and controls preferably utilize heavy duty relays which may be operated by switches with smaller current-carrying capacity.

Figure 8:
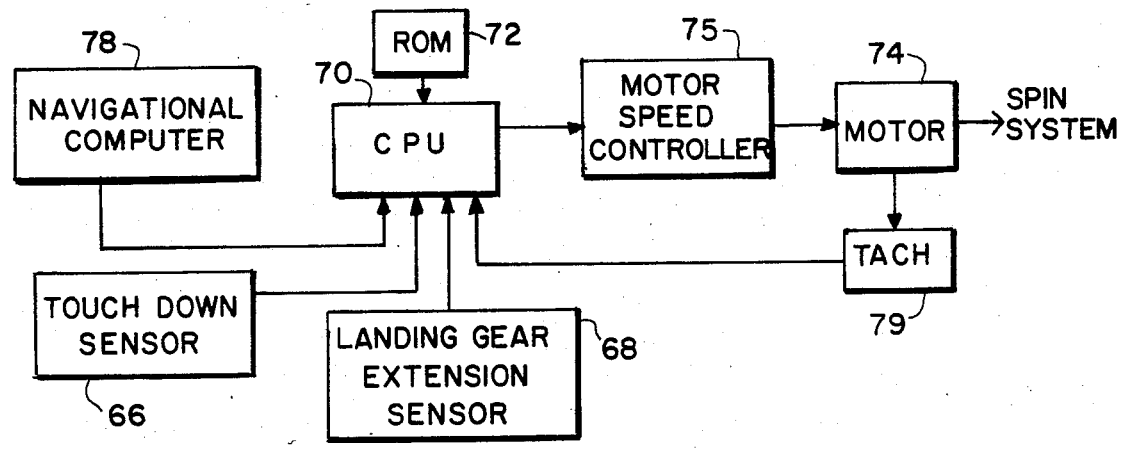
FIG. 8 is a block diagram of an automatic control system for the invention.

In large transport-type aircraft and military aircraft which are highly instrumented, it is preferable to operate the invention automatically to eliminate additional loads on the pilots during landing. In FIG. 8, a suitable automatic control system is shown in block diagram form. A central processor unit (CPU) 70 is provided with a read-only memory (ROM) 72 which is programmed in accordance with the circumference of the tires used on the aircraft and the ratio of the motor drive to wheel drive. The CPU 70 calculates the rpm necessary from the motor to match any required ground speed. The on-board navigational computer 78 provides a signal output indicative of ground speed which is fed to CPU 70. As will be understood, if only an analog signal is available, this may be digitized and coded as required by the CPU program. The CPU 70 is controlled by a landing gear extension sensor 68 which produces an enabling command to the CPU 70. Sensor 68 may be operated from the normal landing gear extension switches operated by the pilot or from suitable Microswitches ® or the like associated with the landing gear itself.

When the enable signal is received by the CPU 70, a command is sent to motor speed controller 75 which may be a well-known electronic speed control circuit which energizes motor 74. A tachometer 79 attached to motor 74 produces a digital word indicative of the rpm of motor 74 which is fed to the CPU 70 in a conventional feedback mode. The CPU 70 calculates the required rpm from the indicated ground speed and the stored parameters in ROM 72, and adjusts motor speed controller 78 until the required rpm is reached. Touchdown sensor 66 is adapted to produce a disable command to CPU 70 such that touchdown of the wheels on the runway causes CPU 70 to interrupt the power to motor 74. Preferably, motor 74 will include a dynamic braking system to quickly stop the motor. It will be understood that interruption of the current to motor 74 will cause at least a slight drop in rpm of the drive sprocket of FIGS. 2 or 5 causing the free-wheeling coupling 15 to release. Thus, very little inertia is present in the drive system and motor 74 will quickly stop. As may now be understood, wheels 8 will have been turning at touchdown at a speed which will minimize scuffing and scraping of the tires upon landing and during rollout.

As may now be recognized, a new and novel system for prespinning aircraft wheels prior to landing has been disclosed which overcomes the disadvantages of the prior art attempts to solve the problem of scuffing and excessive wear on tires during landing. Although a specific embodiment has been disclosed, this is for exemplary purposes only and various modifications may be made without departing from the spirit or scope of the invention.

I claim:

1. A landing gear drive system for prespinning a landing wheel of an aircraft prior to landing of the aircraft comprising:

(a) free wheeling clutch means attached to each wheel of said aircraft, said clutch means for coupling to said wheel when the rotational speed of said clutch means is equal to or greater than the rotational speed of said wheel and decoupling from said wheel when the rotational speed of said clutch means is less than the rotational speed of said wheel;

(b) drive motor means coupled to each of said free wheeling clutch means for rotating said clutch means;

(c) first control means for energizing said drive motor means when said wheel is in position for landing;

(d) second control means for adjusting the rotational speed of said clutch means when coupled to said wheel to cause the periphery of said wheel to have the same linear velocity as the ground speed of said aircraft at the point of touchdown thereof, said second control means including means for stopping said drive motor means at said point of touchdown thereby causing said clutch means to decouple from said wheel; said second control means having (i) a central processing unit (CPU);

(ii) a read only memory having data stored indicative of the circumference of said wheel and the ratio of the rpm of said motor to the rpm of said wheel when said wheel is being driven from said motor;

(iii) a navigational computer having an output connected to said CPU in which digital information representative of the ground speed of said aircraft is presented to said CPU;

(iv) a motor speed controller for controlling the speed of said motor, said motor speed controller connected to and controlled by said CPU;

(v) a tachometer operatively connected to said motor and having an output connected to said CPU;

(vi) a touchdown sensor having an output connected to said CPU;

(vii) a landing gear extension sensor having an output connected to said CPU; and (viii) said CPU programmed to energize said motor in response to a signal from said landing gear extension sensor to control the speed of said motor to produce a rotational speed of said wheel such that the linear velocity of the periphery of said wheel is equal to the ground speed indication to said CPU from said navigational computer.

2. The system as defined in claim 1 in which said free wheeling clutch means includes:

an axle attached to and concentric with said wheel;

an outer drum concentric with and integral with said axel, said drum having an inner concentric surface, said surface including a plurality of first helical grooves aligned essentially axially therewith, and an inner face having a first annular clutch surface concentric with said axle;

an inner drum having an outer peripheral surface and an inner peripheral surface, said peripheral surface having a plurality of first helical splines complementary to said first helical grooves, said inner drum disposed within said outer drum wherein said first helical splines engage said first helical grooves;

a spider rotatably disposed on said axle and within said inner drum, said spider having a hub and a plurality of peripheral openings therein, each of said openings formed by a pair of radial projections projecting from said hub and an arcuate ramp surface of said hub between said pair of radial projections, and an opening therethrough concentric with said axle and having therein a plurality of second helical grooves aligned essentially axially therewith, and an outer face disposed immediately adjacent said inner face of said outer drum, said outer face having a second annular clutch surface concentric with said opening and facing said first clutch face;

a plurality of rollers with one of said rollers disposed axially within each of said peripheral openings between said ramp and said inner surface of said inner drum;

a plurality of springs having a spring associated with and between each of said rollers and one of said projections so as to urge its associated roller along and up said ramp so as to be in contact with said ramp and said inner surface of said inner drum;

helical drive unit having an inner cylindrical tubular portion rotatable disposed over said axle, said tubular portion having an outer surface having a plurality of second helical splines complementary to said second helical grooves, said drive unit having an outer tubular portion, said drive unit disposed within said opening of said spider wherein said second helical splines engage said second helical grooves;

drive sprocket drivably and slidably attached to said outer tubular portion of said helical drive unit and coupled to said drive motor means whereby rotation of said drive sprocket causes said spider to rotate said ramps and said rollers adapted to cause each roller to advance up said associated ramp to thereby cause said roller to be gripped by said ramp and said inner surface of said inner drum causing said spider to rotate said outer drum which further causes said second clutch surface to engage said first clutch surface when said sprocket is rotating at a speed of rotation greater than or equal to that of said wheel and to cause said first and second clutch surfaces and said rollers to be released when said spider is rotating at a lower rotational speed than that of said wheel.

3. The system as defined in claim 1 in which said free wheeling clutch means includes:

an axle attached to and concentric with said wheel;

a drum concentric with and integral with said axle; said drum having an inner concentric surface;

a spider rotatably disposed on said axle and within said drum, said spider having a hub and a plurality of peripheral openings therein, each of said openings formed by a pair of radial projections projecting from said hub and an arcuate ramp surface of said hub of radial projections; a plurality of rollers having one of said rollers disposed axially in each of said openings between said ramp and said inner surface of said drum;

a spring associated with and between each of said rollers and said projections disposed to urge its associated roller along and up said ramp so as to be in contact with said ramp and said inner surface of said drum;

a sprocket concentric with and integral with said spider and external to said drum, said sprocket coupled to said drive motor means whereby said drive motor means rotates said spider, said ramps and said rollers adapted to cause each roller to advance up said associated ramp to thereby cause said roller to be gripped by said ramp and said inner surface causing said spider to rotate said drum when said sprocket is rotating at a speed of rotation greater than or equal to that of said wheel and to cause said rollers to be released when said spider is rotating at a lower rotational speed than that of said wheel.

* * * * *